US011634337B2

(12) United States Patent
Moore et al.

(10) Patent No.: US 11,634,337 B2
(45) Date of Patent: Apr. 25, 2023

(54) CHEMICAL PROCESS FOR THE MANUFACTURE OF MAGNESIUM BICARBONATE FROM IMPURE REAGENT INCLUDING MAGNESIUM HYDROXIDE AND CALCIUM CARBONATE

(71) Applicants: Randall P. Moore, Powell, TN (US); Kevin B. Jackson, Knoxville, TN (US); James G. Blencoe, Oak Ridge, TN (US)

(72) Inventors: Randall P. Moore, Powell, TN (US); Kevin B. Jackson, Knoxville, TN (US); James G. Blencoe, Oak Ridge, TN (US)

( * ) Notice: Subject to any disclaimer, the term of this patent is extended or adjusted under 35 U.S.C. 154(b) by 376 days.

(21) Appl. No.: 16/992,202

(22) Filed: Aug. 13, 2020

(65) Prior Publication Data

US 2022/0048784 A1 Feb. 17, 2022

(51) Int. Cl.
*C01F 5/00* (2006.01)
*C01F 5/24* (2006.01)
*C01F 5/22* (2006.01)
*C22B 26/22* (2006.01)
*C22B 7/00* (2006.01)

(52) U.S. Cl.
CPC ............... *C01F 5/24* (2013.01); *C01F 5/22* (2013.01); *C22B 7/007* (2013.01); *C22B 26/22* (2013.01); *C01P 2006/80* (2013.01)

(58) Field of Classification Search
CPC ... C01F 5/22; C01F 5/24; C22B 26/22; C22B 7/007; C01P 2006/80
See application file for complete search history.

(56) References Cited

U.S. PATENT DOCUMENTS

| 935,418 | A | 9/1909 | Sisson |
|---|---|---|---|
| 1,361,324 | A | 12/1920 | Grunwald |
| 4,065,396 | A | 12/1977 | Dickey |
| 4,260,192 | A | 4/1981 | Shafer |
| RE34,164 | E | 1/1993 | Misra |
| 5,776,424 | A | 7/1998 | Martin |
| 5,979,461 | A | 11/1999 | Bensalem |
| 7,648,032 | B2 | 1/2010 | Yuan |
| 7,887,694 | B2 | 2/2011 | Constantz |
| 7,922,991 | B2 | 4/2011 | Mitsuhashi |
| 8,551,428 | B2 | 10/2013 | Pohl |

FOREIGN PATENT DOCUMENTS

| EP | 0 526 121 | 2/1993 |
|---|---|---|
| GB | 544907 | 5/1942 |
| GB | 548197 | 9/1942 |
| GB | 594262 | 11/1947 |

*Primary Examiner* — Steven J Bos
(74) *Attorney, Agent, or Firm* — Mark A. Litman & Associates, P.A.

(57) ABSTRACT

A process for the chemical conversion of contaminated magnesium hydroxide to high purity solutions of magnesium bicarbonate include steps of providing an impure reagent including at least 40% and less than 95% by total weight of total metals of magnesium in a form of solid magnesium hydroxide and at least 10% by weight of total metals of calcium carbonate, combining the impure reagent containing the solid magnesium hydroxide with carbonic acid in water, thereby generating magnesium bicarbonate and water and then filtering out solid calcium carbonate leaving a solution of magnesium bicarbonate in water having a by weight ratio of Mg/(Mg+Ca) in the solution of greater than 95%. Heating and/or drying the magnesium bicarbonate solution produces correspondingly high purity magnesium carbonate.

16 Claims, 2 Drawing Sheets

CHEMICAL PROCESS FOR THE MANUFACTURE OF MAGNESIUM BICARBONATE FROM IMPURE REAGENT INCLUDING MAGNESIUM HYDROXIDE AND CALCIUM CARBONATE

BACKGROUND OF THE INVENTION

1. Field of the Invention

The present invention relates to the fields of environmental cleaning, carbon-neutral processing and conversion of inorganic magnesium oxides to inorganic magnesium carbonates and magnesium bicarbonates.

2. Background of the Art

Magnesium and its various inorganic forms are found natural in nature and have many commercial uses, including both structural in the formation of concrete, cosmetics and in over-the-counter medical treatments. There are many forms of inorganic magnesium compounds that have been directly mined, often leaving significant residues or tailing around the mine sites. Although the compounds themselves tend to be relatively harmless from a health standpoint, they can form geologic surfaces that can shift or even fluidize under certain conditions, rendering them unsafe and the land unusable for any commercial or residential purposes. At the same time, the minerals themselves may have significant commercial potential if they could be collected, converted to a more useful chemical structure and then used commercially. This is especially true with respect to tailings and natural formations including magnesium oxide.

The tailings of magnesium oxide can oftentimes be found with relatively or significantly high levels of purity, as from 50→90% purity. Sometimes the impurities in mining tailings can be little more than collected dirt and grime, and in some oceanside tailings collections on the California Coast, there may be little more than saltwater residue over the particulates.

There are numerous processes used to convert various forms of inorganic magnesium into other desired magnesium forms, but no process for economically and environmentally safe procedures for converting large volumes of magnesium oxide into commercially useful and high purity magnesium carbonate have been found with minor levels of impurities.

Among the many inorganic magnesium processes, including reclamation of magnesium, identified include U.S. Pat. No. 4,065,396 (Dickey) where it was discovered that, whereas magnesium oxide of commerce, usually made by roasting hydrated magnesia, is inert to the action of $CO_2$ and methanol, when the oxide is made by roasting magnesium carbonate at a critical temperature in the range of 600°-1200 F°, it dissolves rapidly in anhydrous methanol under $CO_2$ pressure, to form a methylate-carbonate. The complex can be emulsified with lubricating oil in the presence of an oil soluble surface-active agent, particularly magnesium mahogany sulfonate, to produce an additive for lubricating oil having a high alkali value in the range of 100-400 mg. KOH per gram.

U.S. Pat. No. 4,260,192 (Shafer) evidences that magnesium values are leached from a fragmented mass containing combusted oil shale particles. Magnesium is leached selectively with respect to calcium compounds and silicates with aqueous solutions of a mixture of purgeable, acid-forming gases such as carbon dioxide with a minor proportion of sulfur dioxide. A two-stage leaching process can employ leachant with dissolved carbon dioxide and sulfur dioxide in a first stage and with a carbon dioxide containing solution in the substantial absence of sulfur dioxide in the second stage. An enriched solution containing magnesium values is withdrawn from the fragmented mass and magnesia is recovered from such enriched solution. In one embodiment a fragmented permeable mass of formation particles containing oil shale and carbonates of calcium and magnesium is formed in an in situ oil shale retort. A combustion zone is advanced through the fragmented mass, whereby kerogen in oil shale in the fragmented mass is decomposed in a retorting zone on the advancing side of the combustion zone to produce gaseous and liquid products including shale oil, and particles containing retorted oil shale are combusted for converting magnesium values to more leachable form such as magnesium oxide. Such a process is also used for leaching combusted oil shale from above ground retorting and combustion.

U.S. Pat. No. 5,776,424 (Martin) evidences a method for making a monovalent inorganic anion-intercalated hydrotalcite-like material by first reacting a magnesium-containing powder and a transition alumina powder in a carboxylic acid-free, aqueous suspension to form a meixnerite intermediate. This intermediate is then contacted with a monovalent inorganic anion, in its acid or soluble salt form, to make a hydrotalcite-like material. The latter is then separated from the suspension. Representative materials include a bromide-, chloride-, nitrate- or vanadate-intercalated, hydrotalcite-like material.

U.S. Reissue Pat. No. 34,164 (Misra) provides another means for synthesizing hydrotalcite. The method comprises heating magnesium carbonate and/or magnesium hydroxide to form activated magnesia, then combining the activated magnesia with an aqueous solution of aluminate, carbonate and hydroxyl ions.

U.S. Pat. No. 7,922,991 (Mitsuhashi) describes a method that includes steps of producing a basic magnesium carbonate comprising a tubular aggregated particle of flaky fine crystals, wherein the tubular aggregated particle has a hollow structure. The method includes a first step of introducing a gas containing carbon dioxide into a suspension of magnesium hydroxide to prepare a solution of magnesium hydrogen carbonate, a second step of adjusting the solution of magnesium hydrogen carbonate to a pH of 7.5 to 11.0 to produce a columnar particle of a normal magnesium carbonate, and a third step of adjusting a suspension of the columnar particles of the normal magnesium carbonate to have a pH of 9.0 to 12.0 and a temperature in a range of 30 to 75° C., followed by keeping the temperature within the range to produce a basic magnesium carbonate.

U.S. Pat. No. 7,887,694 (Constantz) describes methods of sequestering carbon dioxide ($CO_2$) are provided. Aspects of the methods include precipitating a storage stable carbon dioxide sequestering product from an alkaline-earth-metal-containing water and then disposing of the product, e.g., by placing the product in a disposal location or using the product as a component of a manufactured composition. Also provided are systems for practicing methods of the invention. The carbonate compounds of the precipitated products may include a number of different cations, such as but not limited to: calcium, magnesium, sodium, potassium, sulfur, boron, silicon, strontium, and combinations thereof. Of interest are carbonate compounds of divalent metal cations, such as calcium and magnesium carbonate compounds. Specific carbonate compounds of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3 6H_2O$), and amorphous calcium carbonate ($CaCO_3 nH_2O$). Magnesium carbonate minerals of interest include, but are not limited to magnesite ($MgCO_3$), barringtonite ($MgCO_3 2H_2O$), nesquehonite ($MgCO_3\text{-}3H_2O$), lanfordite ($MgCO_3 5H_2O$), hydromagnisite, and amorphous magnesium carbonate ($MgCO_3 nH_2O$). Calcium magnesium carbonate minerals of interest include, but are not limited to dolomite ($CaMgCO_3$), huntitte ($CaMg(CO_3)_4$) and sergeevite ($Ca_2Mg_311(CO_3)_{13}\cdot H_2$). The carbon compounds of the product may include one or more waters of hydration, or may be anhydrous.

Brucite, the mineral form of $Mg(OH)_2$ commonly found in nature also occurs in the 1:2:1 clay minerals amongst others, in chlorite, in which it occupies the interlayer position normally filled by monovalent and divalent cations such as $Na^+$, $K^+$, $Mg^{2+}$ and $Ca^{2+}$. As a consequence, chlorite interlayers are cemented by brucite and cannot swell nor shrink. Brucite, in which some of the $Mg^{2+}$ cations have been substituted by $Al^{3+}$ cations, becomes positively charged and constitutes the main basis of layered double hydroxide (LDH). LDH minerals as hydrotalcate are powerful anion sorbents but are relatively rare in nature.

Brucite may also crystalize in cement and concrete in contact with seawater. Indeed, the $Mg^{2+}$ cation is the second most abundant cation in seawater, just behind $Na^{2+}$ and before $Ca^{2+}$. Because brucite is a swelling mineral, it causes a local volumetric expansion responsible for tensile stress in concrete. This leads to the formation of cracks and fissures in concrete, accelerating its degradation in seawater. For the same reason, dolomite cannot be used as construction aggregate for making concrete. The reaction of magnesium carbonate with the free alkali hydroxides present in the cement porewater also leads to the formation of expansive brucite.

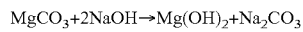

$$MgCO_3 + 2NaOH \rightarrow Mg(OH)_2 + Na_2CO_3$$

This reaction, one of the two main alkali-aggregate reaction (AAR) is also known as an alkali-carbonate reaction. Materials found in nature mat also be found as reactants with $Ca(OH)_2$ so that Calcium carbonate is formed naturally with the Magnesium hydroxide.

U.S. Pat. No. 8,551,428 (Pohl) relates to a process for preparing hydromagnesite in an aqueous environment. The invention further relates to such hydromagnesite having a specific platy-like morphology in combination with a specific average particle size and to their use as minerals, fillers and pigments in the paper, paint, rubber and plastics industries and to the use as flame-retardant. It is disclosed therein that It should be appreciated that hydromagnesite is a very specific mineral form of magnesium carbonate and occurs naturally as small needle-like crystals or crusts of acicular or bladed crystals. In addition thereto, it should be noted that hydromagnesite is a distinct and unique form of magnesium carbonate and is chemically, physically and structurally different from other forms of magnesium carbonate. Hydromagnesite can readily be distinguished from other magnesium carbonates by x-ray diffraction analysis, thermogravimetric analysis or elemental analysis. Unless specifically described as hydromagnesite, all other forms of magnesium carbonates (e.g. artinite ($Mg_2(CO_3)(OH)_2 \cdot 3H_2O$), dypingite ($Mg_5(CO_3)_4(OH)_2 \cdot 5H_2O$), giorgiosite ($Mg_5(CO_3)_4(OH)_2 \cdot 5H_2O$), pokrovskite ($Mg_2(CO_3)(OH)_2 \cdot 0.5H_2O$), magnesite ($MgCO_3$), barringtonite ($MgCO_3 \cdot 2H_2O$), lansfordite ($MgCO_3 \cdot 5H_2O$) and nesquehonite ($MgCO_3 \cdot 3H_2O$)) are not hydromagnesite within the meaning of the present invention and do not correspond chemically to the formula described above.

Besides the natural hydromagnesite, synthetic hydromagnesites (or precipitated magnesium carbonates) can be prepared. For instance, U.S. Pat. No. 1,361,324, U.S. Pat. No. 935,418, GB 548,197 and GB 544,907 generally describe the formation of aqueous solutions of magnesium bicarbonate (typically described as "$Mg(HCO_3)_2$"), which is then transformed by the action of a base, e.g., magnesium hydroxide, to form hydromagnesite. Other processes described in the art suggest to prepare compositions containing both, hydromagnesite and magnesium hydroxide, wherein magnesium hydroxide is mixed with water to form a suspension which is further contacted with carbon dioxide and an aqueous basic solution to form the corresponding mixture; cf. for example U.S. Pat. No. 5,979,461.

Additionally, general processes for preparing magnesium carbonate are described in the art. For example, EP 0 526 121 describes a calcium-magnesium carbonate composite consisting of calcium carbonate and magnesium carbonate hydroxide and a method for the preparation thereof. Furthermore, GB 594,262 relates to a method and apparatus for treating magnesia-containing materials, such as magnesium and calcium carbonate materials for obtaining respective carbonates in discrete and separate forms, by controlled carbonation such that the magnesium and calcium carbonates may be separated by mechanical means and with attainment of special utilities in separated products. US 2007194276 describes a method of reductively bleaching a mineral slurry comprising adding in the mineral slurry an effective amount of a formamidine sulfinic acid (FAS) and an effective amount of a borohydride to reductively bleach the mineral slurry.

SUMMARY OF THE INVENTION

Contaminated batches of magnesium hydroxide (in the presence of calcium carbonate as a major (at least 10% by total weight of magnesium hydroxide and calcium carbonate) is converted to magnesium bicarbonate in a process including:

providing a reagent including solid magnesium hydroxide, combining the solid magnesium hydroxide with carbonic acid in water, and thereby generating magnesium bicarbonate and water. The magnesium hydroxide (in the contaminated mixture with calcium carbonate) may be first formed by reaction of magnesium carbonate with an inorganic hydroxide. The inorganic hydroxide may, for example, selected from the group consisting of ammonium hydroxide, lithium hydroxide, potassium hydroxide, sodium hydroxide and calcium hydroxide.

Because of a determined significant rate of reaction differentiation between the rate of the magnesium hydroxide reaction with carbonic acid and the rate of the calcium carbonate reaction with carbonic acid, the calcium carbonate can be filtered or otherwise collected out of the formed magnesium bicarbonate solution and solution compositions with over 95% by weight magnesium/(magnesium+calcium) can be formed. These solutions may be heated or dried to provide similarly pure carbonate solids (e.g., with over 95% by weight magnesium/(magnesium+calcium)).

A process for the chemical conversion of contaminated magnesium hydroxide to high purity solutions of magnesium bicarbonate include steps of providing an impure reagent including at least 40% and less than 95% by total weight of total metals of magnesium in a form of solid magnesium hydroxide and at least 10% by weight of total metals of calcium carbonate, combining the impure reagent containing the solid magnesium hydroxide with carbonic acid in water, thereby generating magnesium bicarbonate and water and then filtering out solid calcium carbonate leaving a solution of magnesium bicarbonate in water having a by weight ratio of Mg/(Mg+Ca) in the solution of greater than 95%. Heating and/or drying the magnesium bicarbonate solution produces correspondingly high purity magnesium carbonate.

An included process, with additional preparation of reactants and further conversion of the intermediate magnesium-bicarbonate products includes a process by which magnesium can be extracted from mixtures of magnesium hydroxide and calcium carbonate materials using carbonic acid produced from carbon dioxide and water. Carbonic acid reacts with magnesium hydroxide to form magnesium bicarbonate. This reaction takes place spontaneously at ambient temperature and pressure preferentially over the reaction of carbonic acid with calcium carbonate. Magnesium bicarbonate is soluble in water up to just over one percent by weight at standard temperature and pressure. The magnesium bicarbonate solution is transferred to a second vessel, where it can be heated. At temperatures of 150° F. to the boiling point of water, the bicarbonate decomposes, giving up a molecule of carbon dioxide, to form magnesium carbonate, which being water insoluble, precipitates readily. The depleted water can then be recycled to the front of the process to remove impurities, or discarded. The precipitated magnesium carbonate can be filtered, centrifuged or gravity separated from the water and dried or maintained in a slurry as the need dictates. The carbon dioxide gas can be collected, compressed, dewatered, and returned to the front end of the process.

DETAILED DESCRIPTION OF THE INVENTION

Figure 1:
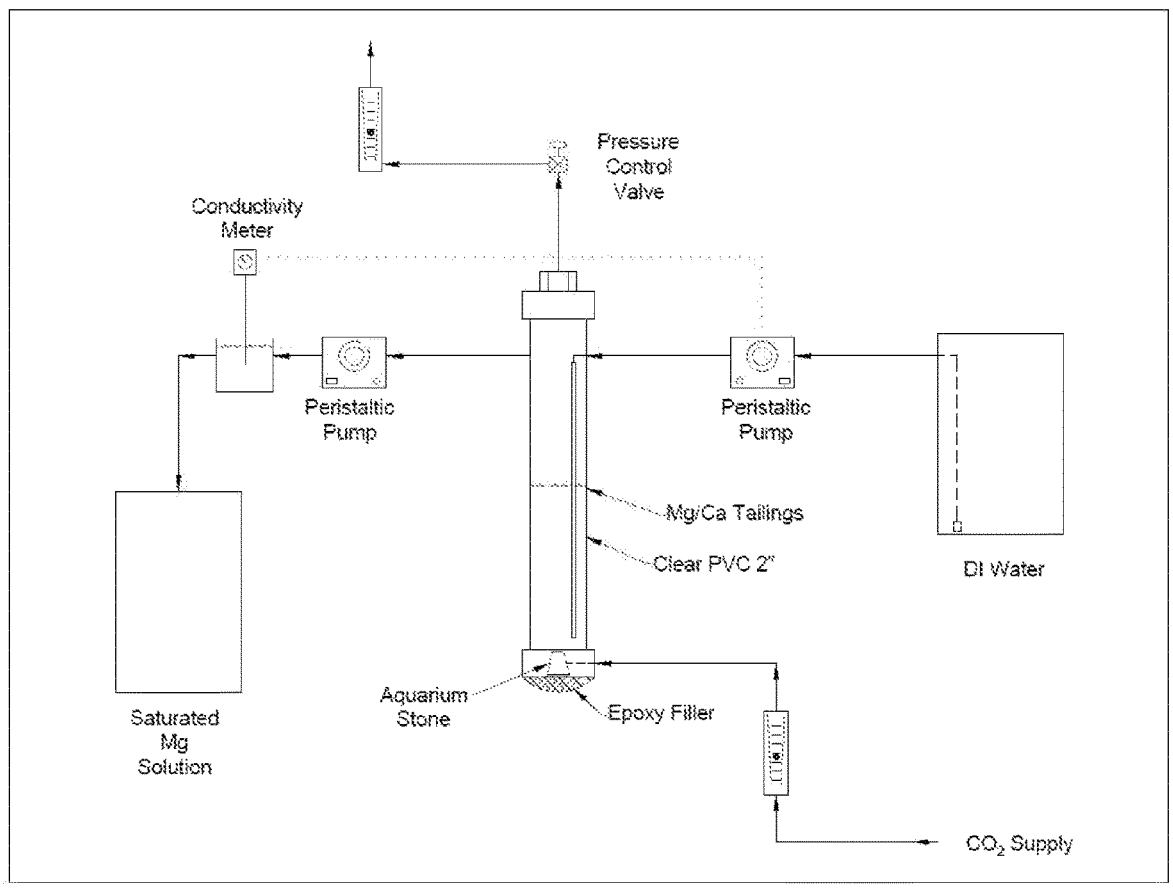
FIG. 1 shows a schematic of a system for performing elements of the present invention in a continuous process.

Contaminated batches of magnesium hydroxide (in the presence of calcium carbonate as a major (at least 10% by total weight of magnesium hydroxide and calcium carbonate) is converted to magnesium bicarbonate in a process including: providing a reagent including solid magnesium hydroxide, combining the solid magnesium hydroxide with carbonic acid in water, and thereby generating magnesium bicarbonate and water. The magnesium hydroxide (in the contaminated mixture with calcium carbonate) may be first formed by reaction of magnesium carbonate with an inorganic hydroxide. The inorganic hydroxide may, for example, be selected from the group consisting of ammonium hydroxide, lithium hydroxide, potassium hydroxide, sodium hydroxide and calcium hydroxide. The limitation on purity is not absolute with respect to the presence of calcium carbonate, but to a relatively minor degree, the amount of impurity will impact the ultimate purity of the final magnesium-containing products. For example, using tailing sources with approximately 40% calcium carbonate to 60% by weight magnesium hydroxide, products (magnesium-bicarbonate) can be formed with >95%, greater than 98%, greater than 99% and even levels greater than 99.5% (actually measured at 99.85% magnesium/(magnesium+calcium)) in the final magnesium carbonate product.

Because of a determined significant rate of reaction differentiation between the rate of the magnesium hydroxide reaction with carbonic acid and the rate of the calcium carbonate reaction with carbonic acid, the calcium carbonate can be filtered or otherwise collected out of the formed magnesium bicarbonate solution and solution compositions with over 95% by weight magnesium/(magnesium+calcium) can be formed. These solutions may be heated or dried to provide similarly pure carbonate solids (e.g., with over 95% by weight magnesium/(magnesium+calcium).

The faster the calcium bicarbonate is filtered out of the solution of magnesium bicarbonate, the higher the purity of the magnesium bicarbonate in the remaining solution as less calcium bicarbonate will have been formed. The differential of the rate of reaction is so significant that the filtration may be done seconds (e.g., 10-90 seconds) after mixing of the reagent with the carbonic acid to obtain highest purity levels, or minutes (e.g., 1-10 minutes, even with heating) to obtain high levels of purity (e.g., >95%) of the magnesium bicarbonate in solution as compared to its proportionality with respect to calcium bicarbonate in solution.

An included process, with additional preparation of reactants and further conversion of the intermediate magnesium-bicarbonate products includes a process by which magnesium can be extracted from mixtures of magnesium hydroxide and calcium carbonate materials using carbonic acid produced from carbon dioxide and water. Carbonic acid reacts with magnesium hydroxide to form magnesium bicarbonate. This reaction takes place spontaneously at ambient temperature and pressure preferentially over the reaction of carbonic acid with calcium carbonate. Magnesium bicarbonate is soluble in water up to just over one percent by weight at standard temperature and pressure. The magnesium bicarbonate solution is transferred to a second vessel, where it can be heated. At temperatures of 150° F. to the boiling point of water, the bicarbonate decomposes, giving up a molecule of carbon dioxide, to form magnesium carbonate, which being water insoluble, precipitates readily. The depleted water can then be recycled to the front of the process to remove impurities, or discarded. The precipitated magnesium carbonate can be filtered, centrifuged or gravity separated from the water and dried or maintained in a slurry as the need dictates. The carbon dioxide gas can be collected, compressed, dewatered, and returned to the front end of the process.

The governing chemical reactions for the process are:

$$1.509\ CO_2(g) + 0.618\ H_2O(liq) \longrightarrow 2.127\ H_2CO_3(sln), \tag{1}$$

$$1.0\ Mg(OH)_2(s) + 2.127\ 2H_2CO_3(sln) \longrightarrow 2.509\ Mg(HCO_3)_2(sln) + 0.618\ (water)\ 2H_2O(liq), \tag{2}$$

$$1.682\ Mg(HCO_3)_2(sln) + 2.064\ H_2SO_4(sln) \longrightarrow 1.509\ MgSO_4(sln) + 2CO_2(g)\uparrow + 2H_2O(liq) \tag{3}$$

[Note: The numbers above the species in Reactions 1-3 are unit mass of reactant per unit mass of Mg(OH)$_2$ by Reaction 2.]

Additionally, and very importantly, the magnesium bicarbonate solution (Mg(HCO$_3$)$_2$(sln)) can be dried, heated or heated and dried to precipitate out or deposit magnesium carbonate with the level of purity of Mg/Ca in the solution. This is a high value, food grade product with significant commercial value. Additionally, the calcium carbonate residue filtered or deposited or otherwise collected in the conversion of the magnesium hydroxide to magnesium bicarbonate is also of commercial quality, and its percentage of purity with respect to magnesium content can be even higher than the Mg/Ca purity in the primary product.

The present invention includes a process in which magnesium hydroxide is converted to magnesium bicarbonate in a process including:

providing a reagent including solid magnesium hydroxide, combining the solid magnesium hydroxide with carbonic acid in water, and thereby generating magnesium bicarbonate and water. The magnesium hydroxide may be first formed by reaction of magnesium carbonate with an inorganic hydroxide. The inorganic hydroxide may, for example, selected from the group consisting of ammonium hydroxide, lithium hydroxide, potassium hydroxide, sodium hydroxide and calcium hydroxide.

The present invention further includes a process for the chemical conversion of magnesium hydroxide to magnesium bicarbonate by:

providing a reagent including solid magnesium hydroxide, combining the solid magnesium hydroxide with carbonic acid in water, thereby generating magnesium bicarbonate and water. The magnesium hydroxide at this stage of the process should constitute greater than 30%, greater than 50% and even greater than 70% by weight of total solids in a reaction mix. The percentage of magnesium hydroxide in some naturally occurring sites and tailings from mining operations can be found in ranges from 50% by weight to 90% by weight and more, especially after the tailings have been washed with water and drained. In mining sites, typical contaminants include carbonates, such as calcium carbonate, which tends to be neutral throughout the entire process when present. When the magnesium bicarbonate is formed (in solution), the calcium carbonate is easily separated by settling or filtering from the bicarbonate solution.

In this process, the magnesium hydroxide may be first formed by reaction of magnesium carbonate with an inorganic hydroxide. In this type of method, the inorganic hydroxide is preferably selected from the group consisting of ammonium hydroxide, lithium hydroxide, potassium hydroxide, sodium hydroxide and calcium hydroxide. As suggested earlier, the solid magnesium hydroxide may be provide at least in part from tailings from a mining operation. In that type of raw sourcing of the magnesium hydroxide, the solid magnesium hydroxide is first washed with water to remove contaminants. The solid magnesium hydroxide may include tailings from a mining operation naturally occurring with less than 40% by total weight of solids as calcium carbonate.

The conversion may be determined by a reaction formula of:

$$Mg(OH)_2(s) + 2H_2CO_3(sln) + xR_y \rightarrow Mg(HCO_3)_2(sln) + 2H_2O(liq) + xR_y,$$

wherein x is approximately and proportionally between 0 and 1.0 and $R_y$ is extraneous solid, inorganic material present with the $Mg(OH)_2$.

In the above sequence of reaction steps, the process of conversion of magnesium oxide to magnesium hydroxide may be determined by a reaction formula of:

$$MgCO_3 + A_x(OH)_z \rightarrow Mg(HCO_3)_2 + H_2O$$

wherein A is an cation selected from the group consisting of $NH_4^+$, $Li^+$, $K^+$, $Na^+$ and $Ca^{+2}$, and z is a number selected from the group consisting of 1 and 2 sufficient to electronically balance the cation.

It is economically and environmentally desirable in the process to have the carbonic acid formed by the reaction mechanism of:

$$CO_2(g) + H_2O(liq) \rightarrow H_2CO_3(sln).$$

This then becomes in part a carbon-fixing process, and as the carbon dioxide is bound, is environmentally desirable.

In the process, not only is it not necessary to convert materials to magnesium oxide, but also no magnesium oxide is formed during the process. Therefore, no magnesium compounds are calcined during the conversion and no magnesium oxide is formed during the conversion process. As described in greater detail herein the conversion may be performed as a continuous or a batch process, with all magnesium from all initial magnesium compounds are present in each sequential step of the process.

Alternative reaction schemes that are known for magnesium compounds include:

$$MgO_2(s) + H_2CO_3(sln) \rightarrow Mg(CO_3)(sln) + H_2O(liq), \text{ and}$$

$$MgO_2(s) + H_2CO_3(sln) + xR_y \rightarrow Mg(HCO_3)(sln) + H_2O(liq) + xR_y$$

wherein x is approximately and proportionally between 0 and 1.0 and $xR_y$ is extraneous (generally inorganic) material present with the $MgO_2(s)$, The conversion process can be performed with contaminated magnesium oxide up to levels where the contaminant can be physically separated (by differential solubility during precipitation or leaching with differential solvents). The purer the starting magnesium oxide, the likely the purer that any product will be. Many tailings are internally highly pure, but can have surface contaminants, as residues from mining processes or accrued contaminants from sand, salt, air-borne materials and organic materials carried by or deposited by organisms.

The process can be operated at ambient temperatures and pressures or the reaction vessel can be pressurized to increase the solubility of magnesium bicarbonate in solution, increasing the production rate. Operating at ambient pressure has been shown to produce better separation of the magnesium and calcium species.

A laboratory scale version of the process is represented in the FIG. 1 in its simplest embodiment. Magnesium rich tailings are ground preferably into particles with a mean diameter of less than 45 microns. Larger particles sizes will work, but the reaction time is increased, and the yield is reduced. Distilled water or deionized water is added to the reaction vessel. Carbon dioxide is introduced to the system from a high concentration source. Ambient air would work, but the concentration of carbon dioxide would increase the reaction times to the point the process would not be economical. The reaction is allowed to proceed with the carbon dioxide flow rate being measured at the inlet and outlet of the reaction vessel. At the beginning of the reaction, most of the carbon dioxide will be consumed by the magnesium hydroxide, which results in the flow rate of carbon dioxide at the outlet being a fraction of the flow rate introduced. Once a substantial portion of the magnesium tailings have been consumed (i.e. converted to magnesium bicarbonate) the outlet carbon dioxide flow rate will increase and approach the magnitude of the inlet flow rate. When the outlet flow rate reaches a predetermined percentage of the inlet, determined experimentally, more distilled water is introduced to the system to dilute the now saturated solution in the reactor, enabling additional reaction between the carbon dioxide and magnesium hydroxide to occur. The conductivity of the solution is measured to confirm that the produced solution is at or near saturation with magnesium bicarbonate. The pH is also measured to determine the reaction products relative to the carbonate equilibrium curve. Once the conductivity drops to a predetermined value, the feed water is cut off and the reactor is again allowed to react until the solution reaches saturation again, and the cycle is repeated until no additional magnesium can be extracted from the tailings. In the laboratory embodiment, the highly enriched magnesium bicarbonate solution is heated to facilitate the precipitation of magnesium carbonate, releasing carbon dioxide to the atmosphere. (In a commercial scale unit, the carbon dioxide would be collected, cleaned, compressed, and reused).

The reaction produces a bright white powder, as shown in the photograph below. The magnesium carbonate shown, produced from process tailings, was analyzed using ion chromatography and was >99.85% pure magnesium relative to calcium content. Magnesium carbonate exists in several forms, including anhydrous and di-, tri-, and pentahydrates known as magnesite ($MgCO_3$), barringtonite ($MgCO_3.2H_2O$), nesquehonite ($MgCO_3.3H_2O$), and lansfordite ($MgCO_3.5H_2O$), respectively. When heated all forms of magnesium carbonate decompose, giving up the water of hydration and ultimately decomposing into magnesium oxide (MgO) and carbon dioxide ($CO_2$) at approximately 350° C. (662° F.).

Magnesium carbonate is used in flooring, fireproofing, cosmetics, dusting powder, and toothpaste. The magnesium carbonate produced by the invention has proven to far exceed the USP requirements for pharmaceutical grade. It could then be used as an antacid and as an anticaking agent in table salt.

Some materials, especially in tailings near ocean water can be cleaned (at least have surface film disrupted and removed) by a simple room temperature water wash. Other materials, such as algae may have to be physically washed under pressure and even separated with flocculation (as with aluminum sulfate) or centrifuged to distinguish solids of different densities. Washes with surfactants or additional solvents specific to the impurities may also be used. Alcohols, and other solvents with too great an activity for magnesium oxide and/or magnesium carbonate may be used.

Particle size is of some functional importance, as extremely large size materials will only slowly be converted and that with primarily surface reactions. Therefor, it may be desirable or essential to crush and pulverize larger particles into powder form (e.g., X-Y microns, millimeters) to facilitate the provision of reactive surfaces of the solid magnesium oxide to convert it to magnesium carbonate (in its targeted composition or state).

FIG. 1 shows a schematic of a system for performing elements of the present invention in a continuous process. In the process, even though continuous flow occurs over periods of time, it is preferred that the process be halted periodically to remove the tailings in the flow stream. This can be done periodically in a steady replenishment/replacement of the tailings, but this can be awkward. It is simpler to stop the flow, empty the tailings chamber, replenish with new tailings and being the flow again, with the carbon dioxide forming the carbonic acid in the flow stream. Because the relative rates of reaction between the magnesium oxide and calcium carbonate are so great, the high levels of purity are still obtained.

Figure 2:
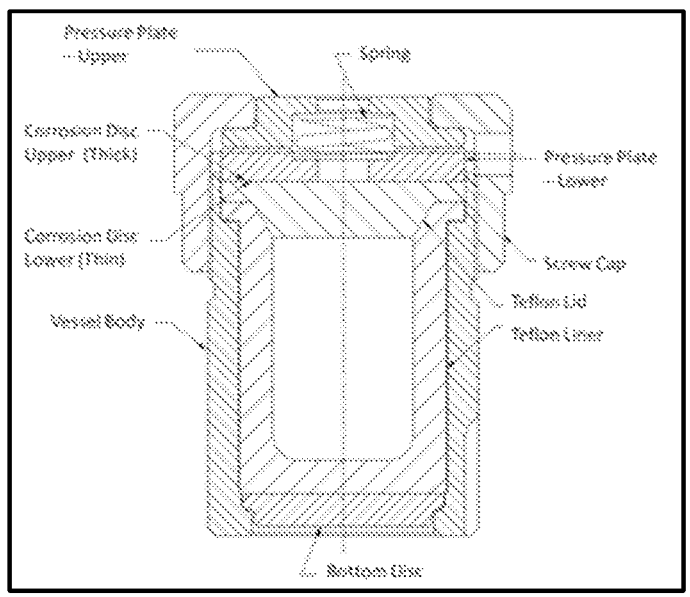
FIG. 2 shows a Parr Bomb apparatus that may be used for a batch process in the practice of the present technology.

FIG. 2 shows a Parr Bomb apparatus made by Parr Instrument Company that may be used for a batch process in the practice of the present technology.

Several variations in the full-scale process can be implemented without changing fundamental sequence of events that generate the product:
1. Initial de-clumping and sizing
2. Final sizing to increase reactive surface area
3. Reaction with carbon dioxide to form magnesium bicarbonate
4. Removal of non-reacted solids
5. Heating to release carbon dioxide to form magnesium carbonate
6. Precipitation
7. Solids separation and
8. Drying As shown in the table, the process has demonstrated consistent efficacy in extracting magnesium from the tailings and forming high-grade magnesium carbonate, with magnesium concentration relative to calcium as high as 99.84%. It is believed, although not yet demonstrated, that reprocessing the magnesium carbonate through the reaction will refine the product. However, since a single pass through the process has produced pharmaceutical grade material, further refining has not been attempted.

| Representative Analytical Results Magnesium Rich Tailings from Moss Landing, California | | | | | |
|---|---|---|---|---|---|
| Sample Name | Na mg/l | K mg/l | Mg mg/l | Ca mg/l | Mg/(Mg + Ca) % |
| Tailings Feed Clay | 324 | n.a. | 232,837 | 169,166 | 57.92 |
| Tailings Feed Sandy | 1682 | n.a. | 205,186 | 165,038 | 55.42 |
| Run 8 Product | 830 | n.a. | 211,000 | 2,910 | 98.64 |
| Run 9 Product | 900 | n.a. | 248,000 | 3,390 | 98.65 |
| Sample Clay Product | 470 | n.a. | 311,000 | 39,200 | 88.81 |
| Run 12 Product | 580 | 1,160 | 243,000 | 12,800 | 95.00 |
| Run 13 Product | 240 | 240 | 236,000 | 2,190 | 99.08 |
| Run 6 Product | 502 | n.a. | 247,775 | 5,929 | 97.66 |
| Run 7 Product | 374 | n.a. | 245,892 | 18,291 | 93.08 |
| Run 3 Product crystals | 255 | n.a. | 211,365 | 345 | 99.84 |
| Run 3 Product surface crystals (duplicate injection) | 507 | n.a. | 212,320 | 350 | 99.84 |

The invention was developed specifically to convert the process tailings deposited in the impoundment at manufacturing sites, such as the Moss Landing site in California. Although the tailings are not hazardous, either from a regulatory or physical/chemical perspective, the 36 acres covered by the material cannot be repurposed or used in any way until the 1.1 million cubic yards of material are removed. The invention has the potential to convert the material into approximately one billion pounds of salable, high-grade magnesium carbonate, representing a significant increase in the value of the tailings and eventually a significant increase in the value of the land.

Once developed, it became clear that other similar sites exist within the United States. These sites could be remediated using the same process, increasing the value to the stakeholders, while providing a "greenfield" level of conversion to the land itself.

The initial experiments with carbonic acid were conducted with commercial beverage grade carbonic acid solution packaged at approximately 50 psig, also known as club soda. The first experiment, done with club soda, produced a product that was 95.97% magnesium carbonate. Given this result, a more quantitative approach was done using a Parr Bomb apparatus, pictured in FIG. 2. A Parr Bomb is a lab scale reaction vessel that can operate at pressures up to 3,000 psig. As shown in FIG. 1, a 100 ml chamber made of Teflon is enclosed inside a stainless-steel pressure unit. The reactants are placed inside the Teflon container and sealed to contain the reactants and the products of the reaction. For each sample, a carefully measured mass of either Clay like or Sandy like tailings were placed in the chamber, with a measured mass of dry ice (solid carbon dioxide).

The Parr bomb was quickly assembled and sealed against the pressure of reaction and placed in a 110° C. oven. After 12 hours, each Parr Bomb was disassembled, the contents were centrifuged, and the liquid was decanted into sample containers. Each sample was desiccated and weighed to determine yield and then two of the samples were analyzed using IC. One of the two samples analyzed produced magnesium carbonate that was 99.11% purity (Mg mass/(Ca+Mg mass)).

What is claimed:

1. A process for the chemical conversion of magnesium hydroxide to magnesium bicarbonate comprising:
providing an impure reagent including at least 40% and less than 95% by total weight of total metals in the impure reagent comprising magnesium in a form of solid magnesium hydroxide and at least 10% by weight of the total metals in the impure reagent comprising calcium carbonate, combining the impure reagent containing the solid magnesium hydroxide and calcium carbonate with carbonic acid in water, thereby generating magnesium bicarbonate and water and then filtering out solid calcium carbonate leaving a solution of magnesium bicarbonate in water having a weight ratio of Mg/(Mg+Ca) in the solution of greater than 98%.

2. The process of claim 1 wherein the magnesium hydroxide is first formed in the impure reagent by reaction of magnesium carbonate with an inorganic hydroxide.

3. The method of claim 2 wherein the inorganic hydroxide is selected from the group consisting of ammonium hydroxide, lithium hydroxide, potassium hydroxide, sodium hydroxide and calcium hydroxide.

4. The process of claim 1 wherein the solid magnesium hydroxide comprises tailings from a mining operation.

5. The process of claim 1 wherein the solid magnesium hydroxide is first washed with water to remove contaminants to form the impure reagent and the solution of magnesium bicarbonate in water has a weight ratio of Mg/(Mg+Ca) in the solution of greater than 99%.

6. The process of claim 1 wherein the solid magnesium hydroxide comprises tailings from a mining operation mixed with less than 40% by weight calcium carbonate.

7. The process of claim 1, wherein the conversion is determined by a reaction formula of:

$$Mg(OH)_2(s) + 2H_2CO_3(\text{solution} + xR_y) \rightarrow Mg(HCO_3)_2(\text{solution}) + 2H_2O(\text{liq}) + xR_y,$$

wherein x is approximately and proportionally between 0 and 1.0 and $R_y$ is extraneous solid, inorganic material present with the $Mg(OH)_2$.

8. The process of claim 2, wherein the conversion of magnesium carbonate to magnesium bicarbonate is determined by a reaction formula of:

$$MgCO_3 + A_x(OH)_z \rightarrow Mg(HCO_3)_2 + H_2O$$

wherein A is a cation selected from the group consisting of $NH_4^+$, $Li^+$, $K^+$, $Na^+$ and $Ca^{+2}$, and z is a number selected from the group consisting of 1 and 2 sufficient to electronically balance the cation.

9. The process of claim 1 wherein the carbonic acid is formed by the reaction mechanism of:

$$CO_2(g) + H_2O(\text{liq}) \rightarrow H_2CO_3(\text{solution}).$$

10. The process of claim 8 wherein the solid magnesium hydroxide comprises tailings from a mining operation mixed with less than 40% by weight calcium carbonate.

11. The process of claim 10 wherein the solid magnesium hydroxide is first washed with water to remove contaminants.

12. The process of claim 1 wherein the conversion of magnesium hydroxide to magnesium bicarbonate is performed as a batch process, with all magnesium from all initial magnesium compounds present in each sequential step of the process.

13. The process of claim 12 wherein the conversion of magnesium hydroxide to magnesium bicarbonate is performed as a batch process, with all magnesium from all initial magnesium compounds present in each sequential step of the process.

14. The method of claim 1 wherein at least 95% by weight of all metals in the impure reagent consist of magnesium and calcium.

15. The method of claim 5 wherein at least 95% by weight of all metals in the impure reagent consist of magnesium and calcium.

16. A process for the chemical conversion of magnesium hydroxide to magnesium bicarbonate comprising:
providing an impure reagent including at least 35% and less than 95% by total weight metals in the impure reagent of magnesium in a form of solid magnesium hydroxide, and at least 3% of calcium carbonate, combining the impure reagent containing the solid magnesium hydroxide and calcium carbonate with carbonic acid in water, thereby generating magnesium bicarbonate and water and then filtering out solid calcium carbonate leaving a solution of magnesium bicarbonate in water having a weight ratio of Mg/(Mg+Ca) in the solution of greater than 95%.

* * * * *